(12) United States Patent
Cazals (10) Patent No.: US 8,473,255 B2
(45) Date of Patent: Jun. 25, 2013

(54) METHOD AND AIDS FOR MODELLING 3D OBJECTS

(75) Inventor: Olivier Cazals, Daux (FR)

(73) Assignee: Airbus Operations SAS, Toulouse (FR)

( * ) Notice: Subject to any disclaimer, the term of this patent is extended or adjusted under 35 U.S.C. 154(b) by 653 days.

(21) Appl. No.: 12/446,902

(22) PCT Filed: Oct. 24, 2007

(86) PCT No.: PCT/FR2007/001755
§ 371 (c)(1),
(2), (4) Date: Apr. 23, 2009

(87) PCT Pub. No.: WO2008/056054
PCT Pub. Date: May 15, 2008

(65) Prior Publication Data
US 2010/0030538 A1     Feb. 4, 2010

(30) Foreign Application Priority Data
Oct. 27, 2006 (FR) ...................... 06 54606

(51) Int. Cl.
*G06F 17/50* (2006.01)

(52) U.S. Cl.
USPC .......................................................... 703/1

(58) Field of Classification Search
USPC .............................. 703/1; 716/110
See application file for complete search history.

(56) References Cited

U.S. PATENT DOCUMENTS

| 6,614,430 B1 * | 9/2003 | Rappoport | 345/420 |
| 7,013,468 B2 * | 3/2006 | Abercrombie et al. | 719/328 |
| 2003/0208285 A1 * | 11/2003 | Regli et al. | 700/30 |

FOREIGN PATENT DOCUMENTS

| EP | 1 298 596 A1 | 4/2003 |
| JP | 2003-108609 | 4/2003 |

OTHER PUBLICATIONS

Lee, Sang Hun "A CAD-CAE integration approach using feature-based multi-resolution and multi-abstraction modelling techniques", Computer-Aided Design, Elsevier, vol. 37, pp. 941-955, (2005).
Ledermann, Christof et al., "Associative parametric CAE methods in the aircraft pre-design", Aerospace Science and Technology, Elsevier, vol. 9, No. 7, pp. 641-651, (2005).
Xu, X. Y. et al., "Multi-model technology and its application in the integration of CAD/CAM/CAE", Journal of Materials Processing Technology, Elsevier, vol. 129, pp. 563-567, (2002).

* cited by examiner

*Primary Examiner* — Omar Fernandez Rivas
*Assistant Examiner* — Bernard E Cothran
(74) *Attorney, Agent, or Firm* — Oblon, Spivak, McClelland, Maier & Neustadt, L.L.P.

(57) ABSTRACT

A method for aiding modelling 3D objects permits production of a parameterizable instantiate model of a 3D object from a generic model of the object and a specific model of a second object including at least a part of first object. Certain characteristic data are extracted from the specific model of the second 3D object according to the parameters of the generic model of the first 3D object. A parameterizable instantiate model is produced from the generic model of the first 3D model by matching this model to the extracted data.

18 Claims, 6 Drawing Sheets

METHOD AND AIDS FOR MODELLING 3D OBJECTS

BACKGROUND OF THE INVENTION

The present invention relates to the design of three-dimensional (3D) objects, and more particularly to a method and devices for aiding in the modeling of 3D objects making it possible to obtain an instantiated model of a 3D object on the basis of a generic model of this object and of specific models of elements of this object or of a specific model of a second object comprising part of this object.

The design of complex assemblies such as airplanes requires the relative positioning of a plurality of elements. The positioning of a first element relative to a second generally involves different disciplines. For example, the positioning of an engine on an airplane wing requires consultation among engine designers, mechanical engineers, aerodynamic engineers, acoustic engineers and specialists of numerous other disciplines.

Traditionally, the study of positioning is organized in the form of successive partial analyses. The specialists of the disciplines having the greatest consequences for choosing the positioning on the basis of predetermined criteria are entrusted with beginning the study and proposing a first position. The study is then passed on to a specialist of another discipline, who will add to it, and so on. When all disciplines have participated in the study, the file is generally sent back to each for validation of the result. If the positioning has been modified during the study and certain criteria for a particular discipline are no longer met, the positioning must be modified and the succession of partial analyses must be repeated by all disciplines in order to validate the new position.

In general, these studies are based on 3D numerical models of real 3D objects. In the course of this process, however, it frequently occurs that the imposed constraints are such that the shape of the object to be positioned must be modified. If this object has been designed by a third party, it is then necessary to submit a request to this third party for a particular version of the numerical model of this object. The analysis is then suspended until the new model has been received. If the shape of the object must be modified several times, considerable delays are caused.

In addition, a specific model received from a third party is generally a static model that does not permit automation of certain tasks or of certain calculations necessary for certain studies.

Although the use of a generic model may permit a preliminary study under certain circumstances, the lack of precision of a generic model usually makes it impossible to carry a precise study through to completion.

A need therefore exists for creating instantiated and realistic models that can be parameterized, in particular to study the positioning of objects with which they are associated relative to other objects.

SUMMARY OF THE INVENTION

The invention makes it possible to solve at least one of the problems described in the foregoing.

Thus the object of the invention is a method for aiding in the geometric modeling of a first object on the basis of a generic model of the first object and of at least one specific model of at least one second object comprising at least part of the first object, the method comprising the following steps:

acquiring the generic model of the first object;

acquiring at least one specific model of at least one second object;

extracting at least one datum from the at least one specific model according to at least one parameter of the generic model; and, constructing an instantiated model of the first object on the basis of the generic model and of the at least one datum extracted from the at least one specific model.

Advantageously, the at least one parameter of the generic model is adapted to the at least one datum extracted from the at least one specific model to construct the instantiated model.

Preferably the generic model is a dynamic model and the specific model is a static model.

The creation of an instantiated model of a 3D object from a generic model makes it possible to obtain a dynamic model adapted to interact with a design software. In particular, an instantiated model permits modification of the parameters of this model and permits automation of certain operations such as calculations, especially estimates of areas or curves.

According to a particular embodiment, the at least one extracted datum is a curve portion characterizing a part of the object to be modeled, which part may be easily extracted from the at least one specific model, directly or by way of a design software. This curve portion is, for example, the intersection of part of the second object with a predetermined plane.

According to another particular embodiment, the method additionally comprises the following steps:

determining the extrema of the curve portion extracted from the at least one specific model; and, adapting the curve portion of the generic model corresponding to the curve portion extracted from the at least one specific model in such a way that the extrema of the curve portion of the generic model are similar to the extrema of the curve portion extracted from the at least one specific model, in order to adjust the curve portion of the generic model rapidly and precisely on the curve portion extracted from the at least one specific model.

Preferably the adaptation step additionally comprises a step of adjusting at least one intermediate point situated between the extrema of the curve portion of the generic model in order to refine the adjustment of the curve portion of the generic model on the curve portion extracted from the at least one specific model.

Preferably the adaptation step also comprises a step of determining at least one tangent to the said curve portion extracted from the at least one specific model at one point at least of the curve portion of the generic model, once again in order to refine the adjustment of the curve portion of the generic model on the curve portion extracted from the at least one specific model.

According to a particular embodiment, the at least one second object corresponds to the first object or is part of the first object, thus making it possible to create an instantiated model of an object on the basis of a specific model of the object or of one or more elements of this object.

According to another particular embodiment, the method additionally comprises a step of importing at least one datum, the imported datum being stored in memory as a parameter of the instantiated model, thus permitting exchange of data between the instantiated models.

According to another particular embodiment, the first object is a 3D object such as a nacelle, an engine or a propulsive assembly.

Another object of the invention is a method for a device comprising means capable of employing each of the steps of the method described in the foregoing.

Another object of the invention is a computer program comprising instructions capable of employing each of the steps of the method described in the foregoing.

BRIEF DESCRIPTION OF THE DRAWINGS

Other advantages, objectives and characteristics of the present invention become evident from the detailed description provided hereinafter by way of non-limitative example, referring to the attached drawings, wherein.

DETAILED DESCRIPTION OF THE INVENTION

The method and the devices according to the invention are tools for aiding in the modeling of a 3D object on the basis of a generic model of this object and of specific models of elements of this object or of specific models of other objects comprising part of this object, intended in particular for conducting studies of engine installations on conventional or non-conventional airplanes. According to a particular implementation, the method uses CATIA 3D design software. The following description illustrates the employment of the invention in this context, but it must be understood that the invention is not limited to this particular implementation.

Catia, developed by the French company Dassault Systèmes and sold by IBM, is a computer-assisted design (CAD) software with 3D orientation, in which all steps of development of a product can be managed.

Figure 1:
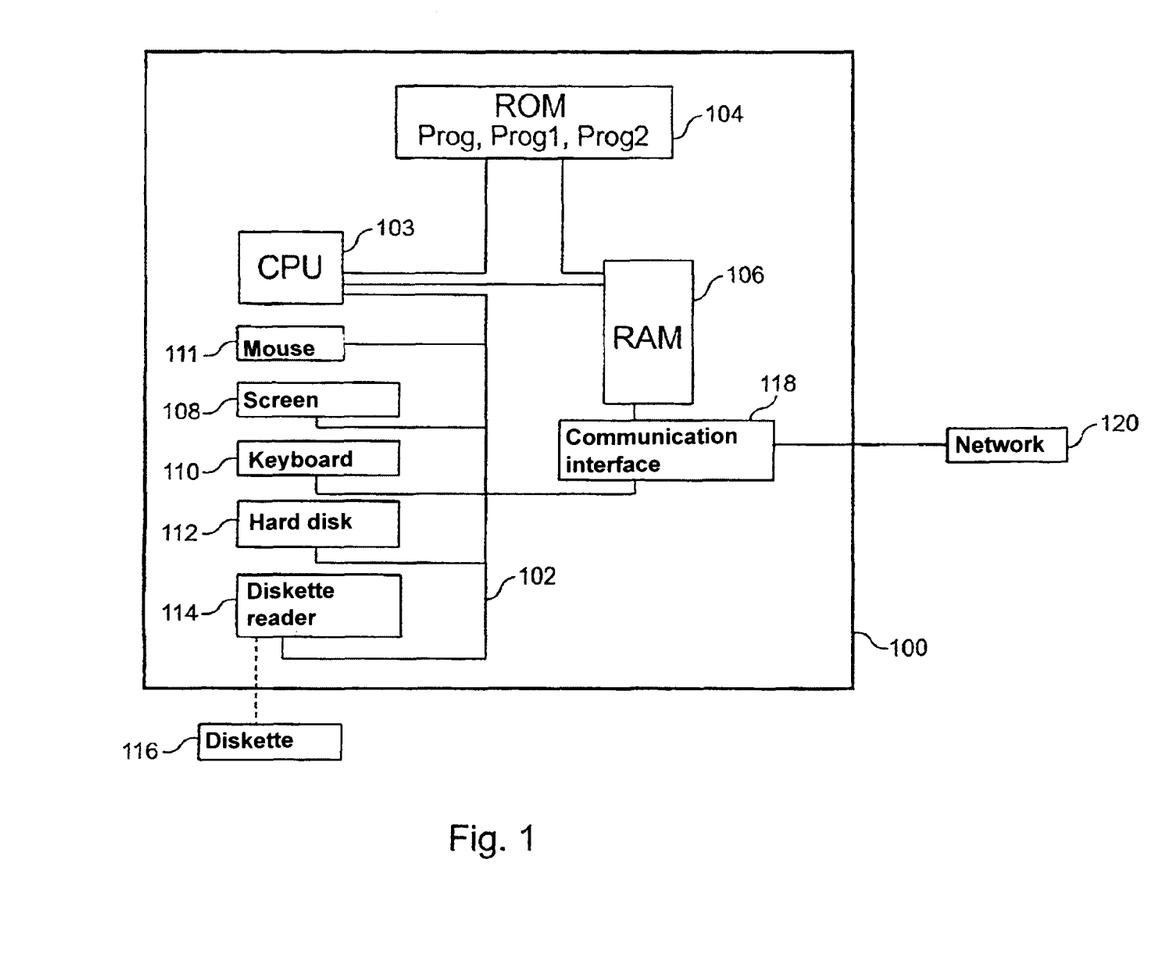
FIG. 1 shows an example of an apparatus for implementing the invention.

FIG. 1 illustrates an example of an apparatus 100 adapted to employ the invention, such as a microcomputer or a workstation.

Preferably, apparatus 100 is provided with a communication bus 102, to which there are connected, a central processing unit 103, such as a microprocessor;

a non-volatile memory 104 or Read Only Memory (ROM), which may be provided with one or more programs "Prog", "Prog1" and "Prog2";

a volatile memory 106 or Random Access Memory (RAM), provided with registers capable of storing in memory the variables and parameters created and modified during execution of the aforesaid programs; and a communication interface 118 connected to a distributed communication network 120 such as the Internet, the interface being capable of transmitting and receiving data.

Optionally, apparatus 100 may be provided with one or more or all of the following devices:

a screen 108 for viewing data and/or for functioning as a graphical user interface that will be able to interact with the programs according to the invention, by means of a keyboard 110 or of any other means, such as a pointing device, for example a mouse 111 or a light pen, a touch screen or a remote controller;

a hard disk 112, which may be provided with programs and/or data, especially data processed or to be processed according to the invention;

a diskette reader 114 capable of receiving a diskette 116 and therein reading or writing data processed or to be processed according to the invention; and, a reader for memory cards, capable of therein reading or writing data processed or to be processed according to the invention.

The communication bus permits communication and interoperability between the different elements included in apparatus 100 or connected thereto. The representation of the bus is not limitative and, in particular, the central unit is capable of communicating instructions to any element of apparatus 100 directly or by way of another element of apparatus 100.

The executable code of the program or programs permitting apparatus 100 to employ the method according to the invention may be stored, for example, on hard disk 112 or in read-only memory 104.

According to one variant, diskette 116 may contain data as well as the aforesaid executable code of programs, which, once read by apparatus 100, may be stored on hard disk 112.

Alternatively, the executable code of the programs may be received by way of communication network 120, via interface 118, to be stored in a manner identical to that described in the foregoing.

The diskettes may be replaced by any information medium such as, for example, a compact disk (CD ROM) or a memory card. In general, an information storage means that may be read by a microcomputer or a microprocessor, which may or may not be integrated in the apparatus, and which may be removable, is capable of storing in memory one or more programs whose execution permits employment of the method according to the invention.

More generally, it will be possible to load the program or programs into one of the storage means of apparatus 100 before they are executed.

Central unit 103 controls the execution of instructions or portions of software code of the program or programs according to the invention, such instructions being stored on hard disk 112, in read-only memory 104 or in the other aforesaid storage elements. During boot-up, the program or programs stored in a non-volatile memory, such as hard disk 112 or read-only memory 104, are transferred into random-access memory 106 (RAM), which then contains the executable code of the program or programs according to the invention as well as registers for storing in memory the variables and parameters necessary for employment of the invention.

It should be noted that the apparatus containing the device according to the invention may also be a programmed apparatus. For example, the instructions of the program or programs employing the invention may be implemented in a programmable or specific integrated circuit (Application Specific Integrated Circuit, ASIC).

In the design phase, the design department has access on the one hand to generic nacelle, engine and propulsive-assembly models and on the other hand to specific nacelle, engine and propulsive-assembly models proposed by the suppliers. While the generic models cannot be used due to the lack of precise data, the specific models suffer from the disadvantage of not being "dynamic", meaning that they cannot be easily modified, they do not permit automation of certain calculations, such as the calculations of weights or coordinates, and they do not permit certain estimates, such as the shattering cones of the engine. According to the invention, therefore, the essential characteristics of a specific model are extracted and added to a generic model in order to obtain an instantiated and dynamic model that can be parameterized and used for studies such as the positioning of a propulsive assembly on an airplane wing.

A specific model received from a supplier is generally a file associated with a particular CAD software, or in other words a file describing points, curves and volumes. Thus the geometric characteristics of specific models proposed by the suppliers are accessible, especially via CATIA software.

The generic models of objects to be modeled are preferably stored in the form of templates, or in other words parametric models associated with a 3D geometry of a part or of an assembly of parts, permitting a user who is not specialized in the computer-assisted design software to retrieve and modify a parameter easily knowing only the result that he hopes to achieve. Thus the use of parametric models makes it possible to obtain a simplified interface for modifying the parameters without modifying the source code. This simplified interface may be presented, for example, in the form of a dialog window permitting visualization and modification of parameters in predetermined fields. The use of parametric models also makes it possible to automate certain calculations or certain tasks such as automatic dimensioning or calculation of weights.

As an example, a parametric nacelle model makes it possible to define
the external shape of the nacelle;
the shape of the nozzle;
the central member of the nozzle;
the engine cowlings and their axis of rotation; and,
the thrust reversers and their axis of rotation.

These data may be stored in memory, for example in the forms of points and profiles. The profiles are preferably defined by a set of points and tangents at these points, so that they may be connected by curves. Each profile corresponds to the intersection, with a predetermined plane, of a curve representing an element of the object associated with the model.

Preferably each parametric model additionally comprises a frame of reference, so that one object can be positioned relative to a second. For example, the frame of reference of a nacelle may be a benchmark, whose origin is situated on the axis of the nacelle, at a predetermined distance from the extreme front point of the nacelle. The X axis may be the axis of the nacelle, the Y axis may be the axis perpendicular to the X axis in the horizontal plane, and the Z axis may be the axis perpendicular to the X axis in the vertical plane.

Thus the profile of a nacelle may be defined according to an X-Y plane and according to an X-Z plane. In a preferred embodiment, two profiles are determined in the X-Z plane, a low profile and a high profile, since the airplane engines are generally not symmetric in the X-Y plane.

Several parametric models of the same 3D object may be created depending on the needs of the study. For example, one parametric model may be created with all the essential information items of a nacelle, while another parametric model may be created with all these essential information items of the nacelle and additionally comprising formulas for calculating weights and risks associated with the positioning.

Similarly, a parametric model may be associated with one or more 3D objects. For example, one parametric model may be used for a nacelle and another for an engine, or one parametric model may be used to model a propulsive assembly comprising a nacelle and an engine.

Hereinafter in the description a specific model refers to a "static" model of a 3D object that can be considered as a vector construct defined by a set of points, lines and surfaces. A specific model is typically a representation of an object received from a supplier. A generic model is a model that can be parameterized and whose values have not been initialized or have been initialized with default values. The values of the parameters of a generic model may therefore be whatever are desired or may be predetermined in such a way to be as close as possible to specific models. An instantiated model is a generic model in which at least certain values have been initialized. An instantiated model is a "dynamic" model permitting the automation of certain tasks or of certain calculations, and the parameters thereof may be modified. An instantiated model is linked dynamically to other instantiated models in order, for example, to automate calculations and to update values, especially coordinate values. A generic model may therefore be considered as the skeleton of an instantiated model.

Figure 2:
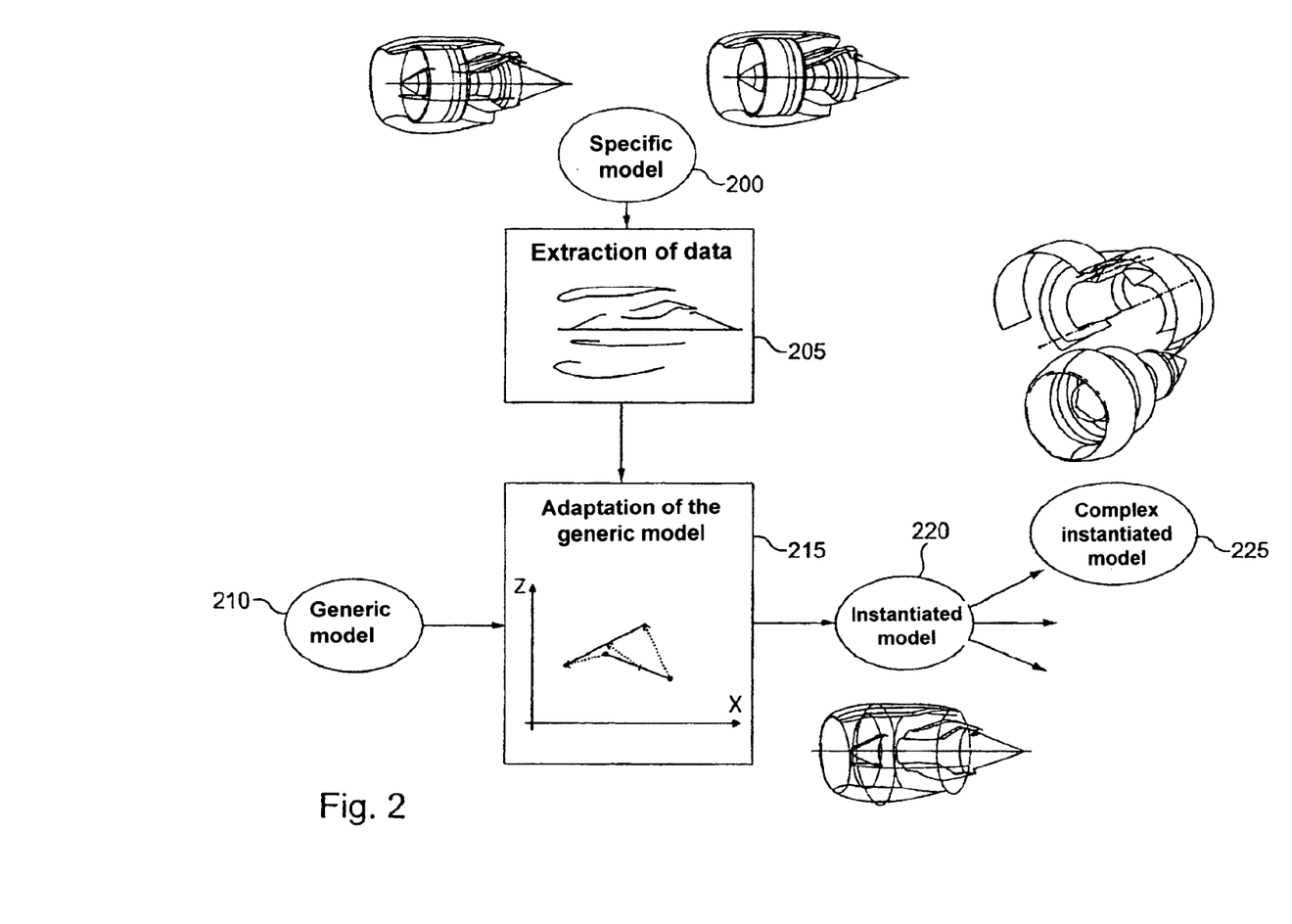
FIG. 2 illustrates certain steps employed by the invention to obtain an instantiated model of a nacelle on the basis of a specific nacelle model and of a generic nacelle model.

FIG. 2 illustrates certain steps employed by the invention to obtain an instantiated model of a nacelle on the basis of a specific nacelle model and a generic nacelle model. The specific model (200) received from a manufacturer is analyzed in such a way that the essential data are extracted (step 205). In this example, the essential data comprise in particular the profile of the nacelle according to predetermined planes. If these profiles are not directly accessible in the specific model, they may be extracted according to a standard function of the design software. The essential data are defined by the nature of the parameters of the generic model. The extraction of these data may therefore be automatic, depending on the generic model used, or may be manual.

The data extracted from the specific model are used to adapt the parameters of a generic model (210) of the 3D object according to an adaptation algorithm described hereinafter in the description (215). The generic model adapted according to the data extracted from the specific model forms an instantiated model (220). The instantiated model may be used as such in the design software. The values of the instantiated model may also be used to create complex instantiated models (225). For example, the values of an instantiated nacelle model may be used to instantiate a generic model of a propulsive assembly, whose values associated with the engine may have been or will be capable of being instantiated according to the same method.

FIG. 3 illustrates an example of the algorithm for adapting a profile stored in memory in a generic model to a profile stored in memory in a specific model of a 3D object. FIG. 3a illustrates a predetermined profile (300) of a generic nacelle model, while FIG. 3b illustrates the profile (305) of the specific model, corresponding to profile 300 of the generic model. In this example, the curve to be adapted is an upper nacelle profile, or in other words the curve formed by the intersection of the nacelle with a plane defined by the X and Z axes. Profile 300 of the generic model is characterized here by five extrema ($E_1$ to $E_5$) and six intermediate points ($I_1$ to $I_6$), determined according to planes orthogonal to the section plane of the profile as well as by the angles of the tangents at each of these points. Profile 300 is therefore not stored as such in memory in the generic model, but only the points and the cited angles of the tangents are stored in memory. The extrema ($E'_1$ to $E'_5$) of profile 305 of the specific model are preferably determined automatically by the design software. When the extrema of the profile extracted from the specific model have been found, a geometric transformation is applied to profile 300 of the generic model, as indicated in FIG. 3c, in such a way that the extrema of the profile of the generic model correspond to the extrema of the profile of the specific model. A different geometric transformation is applied to each part of the profile defined by two neighboring extrema.

Figure 3A:
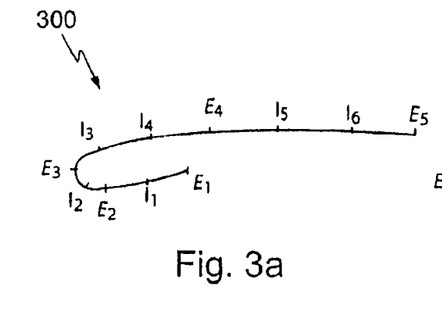
FIG. 3 schematically illustrates an example of employment of an algorithm for adapting a profile stored in memory in a generic model to a profile stored in memory in a specific model of a 3D object.
Figure 3B:
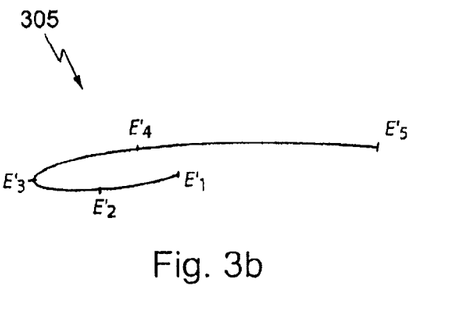
Figure 3C:
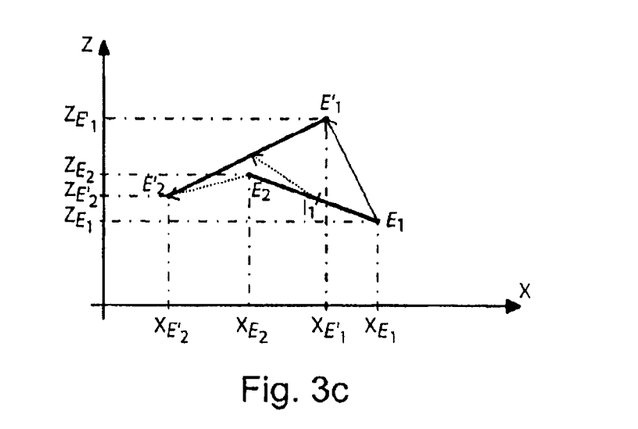

Thus, in the example illustrated in FIG. 3c, the extrema $E_1$ and $E_2$, whose coordinates are $(x_{E1}; z_{E1})$ and $(x_{E2}; z_{E2})$ respectively, take the values of the extrema $E'_1$ and $E'_2$, whose coordinates are $(x_{E'1}; z_{E'1})$ and $(x_{E'2}; z_{E'2})$ respectively. The new coordinates of the intermediate point $I_1$ are calculated automatically according to the position of the extrema, the angle of the tangent at these points and the tensions of the tangents at these points (the tension of a tangent determines the influence of the tangent on the points in the neighborhood of the point where a tangent is situated). This curve deformation function, commonly used in computer-assisted design software programs, is not described in detail here.

Figure 3D:
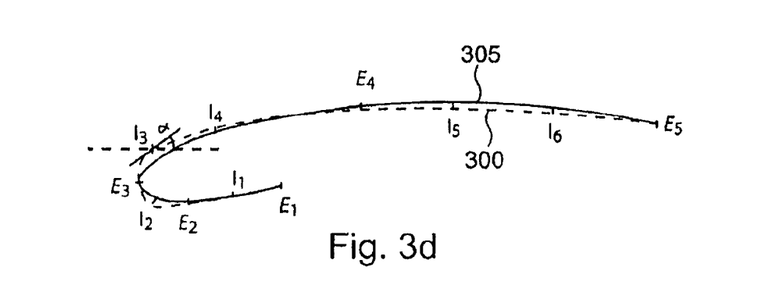

FIG. 3d shows the superpositioning of profiles 300 and 305 after a first adaptation associated with the superpositioning of the extrema.

If the intermediate points of the profile adapted to the generic model are not situated on the profile of the specific model or close to the profile of the specific model, the user may shift these intermediate points. According to a particular implementation, the shifting of these intermediate points is accomplished by a simple increment or decrement that shifts a selected intermediate point along the profile of the generic model, or in other words by shifting the plane associated with the intermediate point in one direction or the other. The user may also modify the angle and the tension of the tangent of the extrema and of the intermediate points to improve the superpositioning of the adapted profile of the generic model on the profile of the specific model. For example, the user may shift the point $I_3$ and adjust the tangent (angle and tension) at this point in such a way as to approximate the curve portions situated between the extrema $E_3$-$E_4$ and $E'_3$-$E'_4$.

Figure 3E:
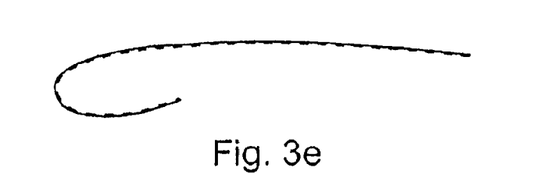

FIG. 3e illustrates profiles 300 and 305 after adaptation of the extrema, of the intermediate points and of the angles and tensions of the tangents.

The method described in the foregoing with reference to FIG. 3 is preferably repeated for all the profiles common to the generic model and specific model. Alternatively, this method is repeated for all the profiles of a set of selected profiles. For example, for a nacelle model, this method is repeated for three different external profiles of the nacelle, for the profile of the nozzle, for the profile of the central member of the nozzle, for the profile of the engine cowlings and their axis of rotation and for the profile of the thrust reversers and their axis of rotation.

When all these profiles or all the selected profiles of the generic model have been adapted, the generic model becomes an instantiated model.

The instantiated model may be used directly in the design software. It may also be used to instantiate a different generic model, such as a more complex generic model, by copying the values of the variables that are common to the instantiated model and the generic model.

Figure 4:
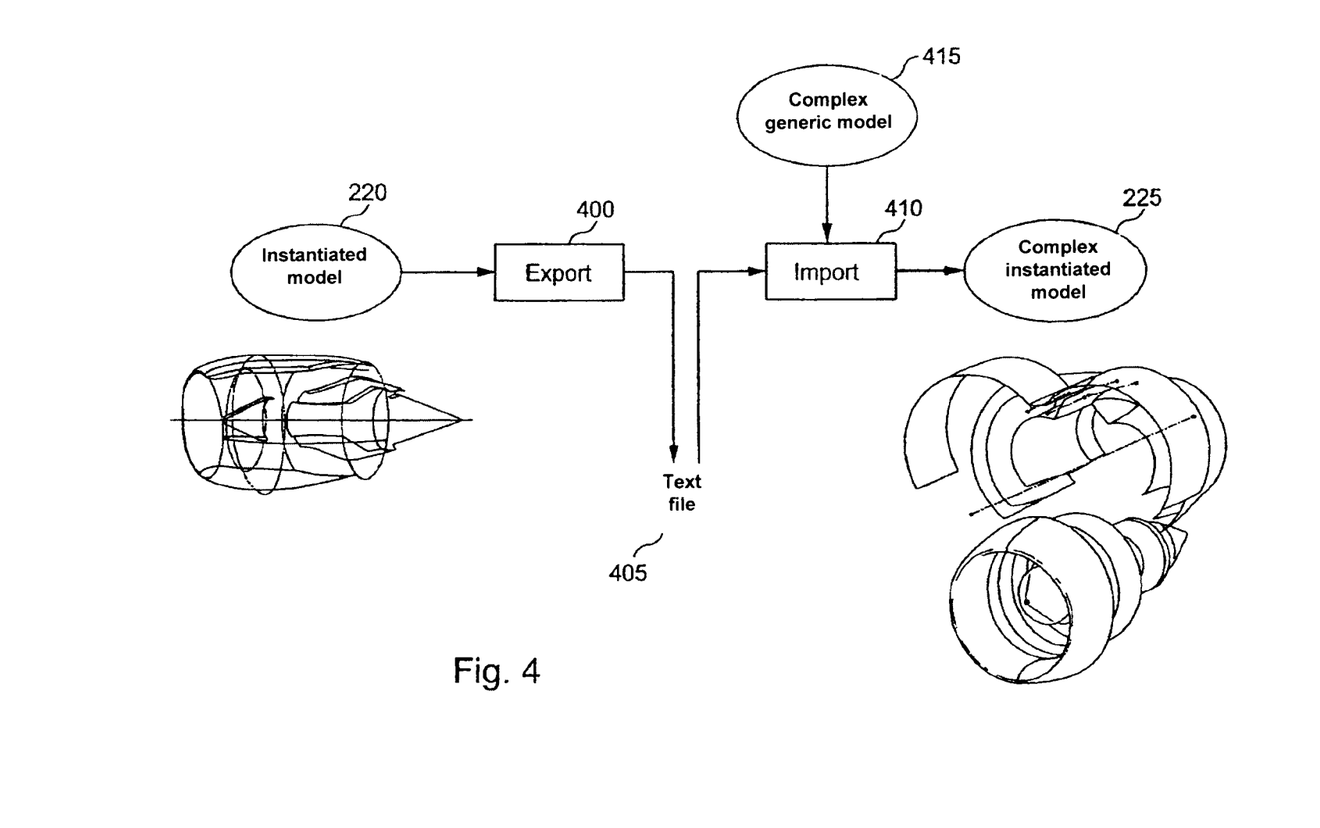
FIG. 4 presents a mechanism for instantiating a generic model on the basis of an instantiated model.

To instantiate a generic model on the basis of a different instantiated model, one solution consists in exporting the data (or part of the data) of the instantiated model that correspond to the variables common to the instantiated model and the generic model in the form of text, and in importing them into the generic model to be instantiated. FIG. 4 illustrates this mechanism. The data of the instantiated model (220) are exported (step 400) in the form of text, for example in the form of a text file (405). The exported data (405) are then imported (step 410) and stored in memory in another generic model, denoted as complex generic model (415) in order to distinguish it from the initial generic model, to form a complex instantiated model (225). It is also possible, according to this same mechanism, to import the data of a complex instantiated model into a simpler generic model. The user may preferably choose the parameters or the profiles to be exported and imported.

In this way an instantiated model of an object may be created on the basis of several specific models of elements of this object. For example, an instantiated model of a propulsive assembly may be created from a generic model of a propulsive assembly, from a specific nacelle model and from a specific engine model, as illustrated in FIG. 5.

A parametric engine model makes it possible to define, for example,
the turbines;
the combustion chamber;
the air inlet cone; and
the front and rear attachment points.

The use of benchmarks of parametric models of the nacelle and engine as well as of the parameters contained in these models makes it possible to position the engine relative to the nacelle when the corresponding generic models are instantiated, or in other words when values are assigned to the parameters that permit this positioning.

Figure 5:
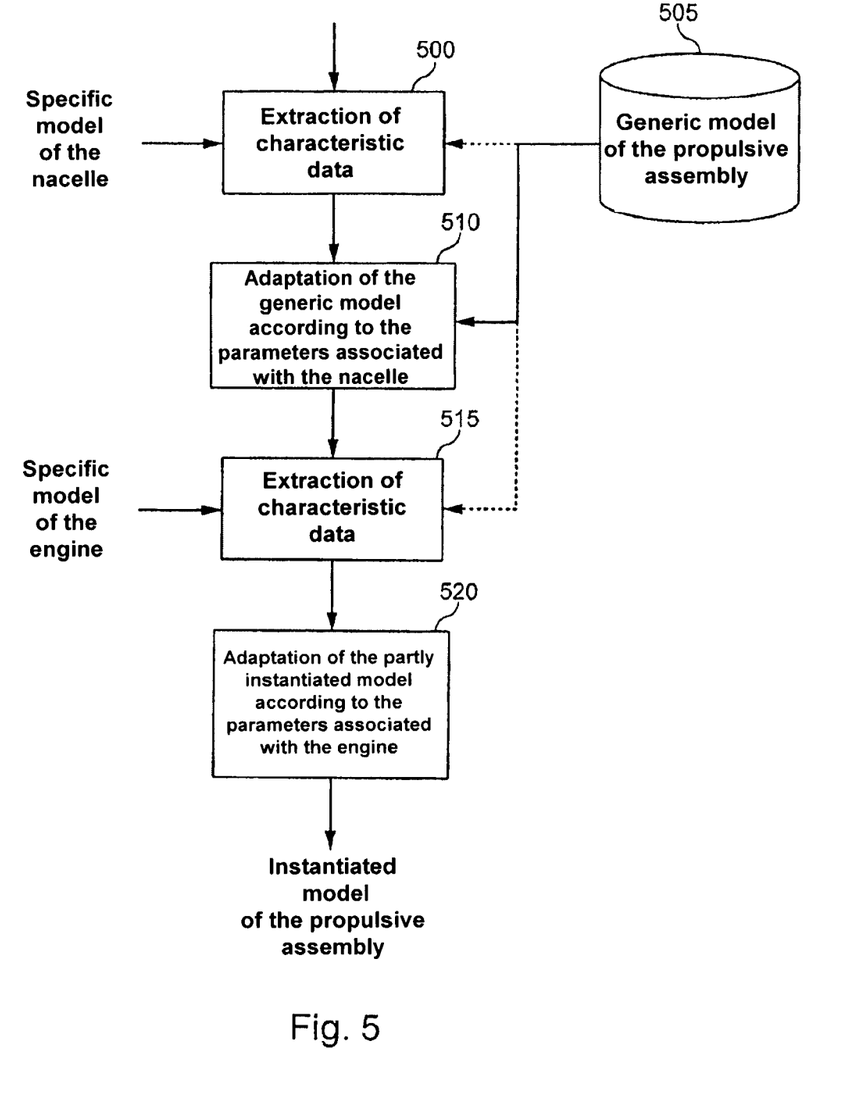
FIG. 5 illustrates certain steps employed by the invention to obtain an instantiated model of a propulsive assembly on the basis of a generic model of an engine-powered propulsive assembly, of a specific nacelle model and of a specific engine model.

FIG. 5 illustrates certain steps employed by the invention to obtain an instantiated model of a propulsive assembly on the basis of a generic model of an engine-powered propulsive assembly, of a specific nacelle model and of a specific engine model.

According to step 500, the curves or profiles and the characteristic points of a nacelle are extracted from the specific model of a nacelle. The curves and the characteristic points of a nacelle may be determined by the user according to the parameters of the generic model used for the propulsive assembly as chosen by the user in a database 505, or may be determined automatically according to the parameters of this generic model selected by the user. The selected generic model is then adapted to the characteristic data extracted from the specific model of the nacelle (step 510). In this step, only the parameters associated with the nacelle are modified. The adaptation of the generic model to the curves extracted from the specific model of the nacelle is preferably accomplished according to the method described in the foregoing with reference to FIG. 3. In the same way, according to step 515, the curves or profiles and the characteristic points of an engine are extracted from the specific model of an engine. Once again, the curves and the characteristic points of an engine may be determined by the user according to the parameters of the selected generic model, or may be determined automatically according to this model. The generic model, partly instantiated in the foregoing according to the characteristics of the nacelle, is then adapted to the characteristic data extracted from the specific model of the engine (step 520). Here again, the adaptation of the curves extracted from the specific model of the engine is preferably accomplished according to the method described in the foregoing. In this step, only the parameters associated with the engine are modified.

It should be noted that steps 515 and 520 may be executed equally well after or before steps 500 and 510. It is also possible to execute only steps 500 and 510 or only steps 515 and 520, depending on the needs associated with the use of the obtained instantiated model.

The obtained instantiated model of the propulsive assembly is characterized by the data extracted from the specific models of the nacelle and of the engine. This instantiated model may be used in a design software such as Catia.

Figure 6:
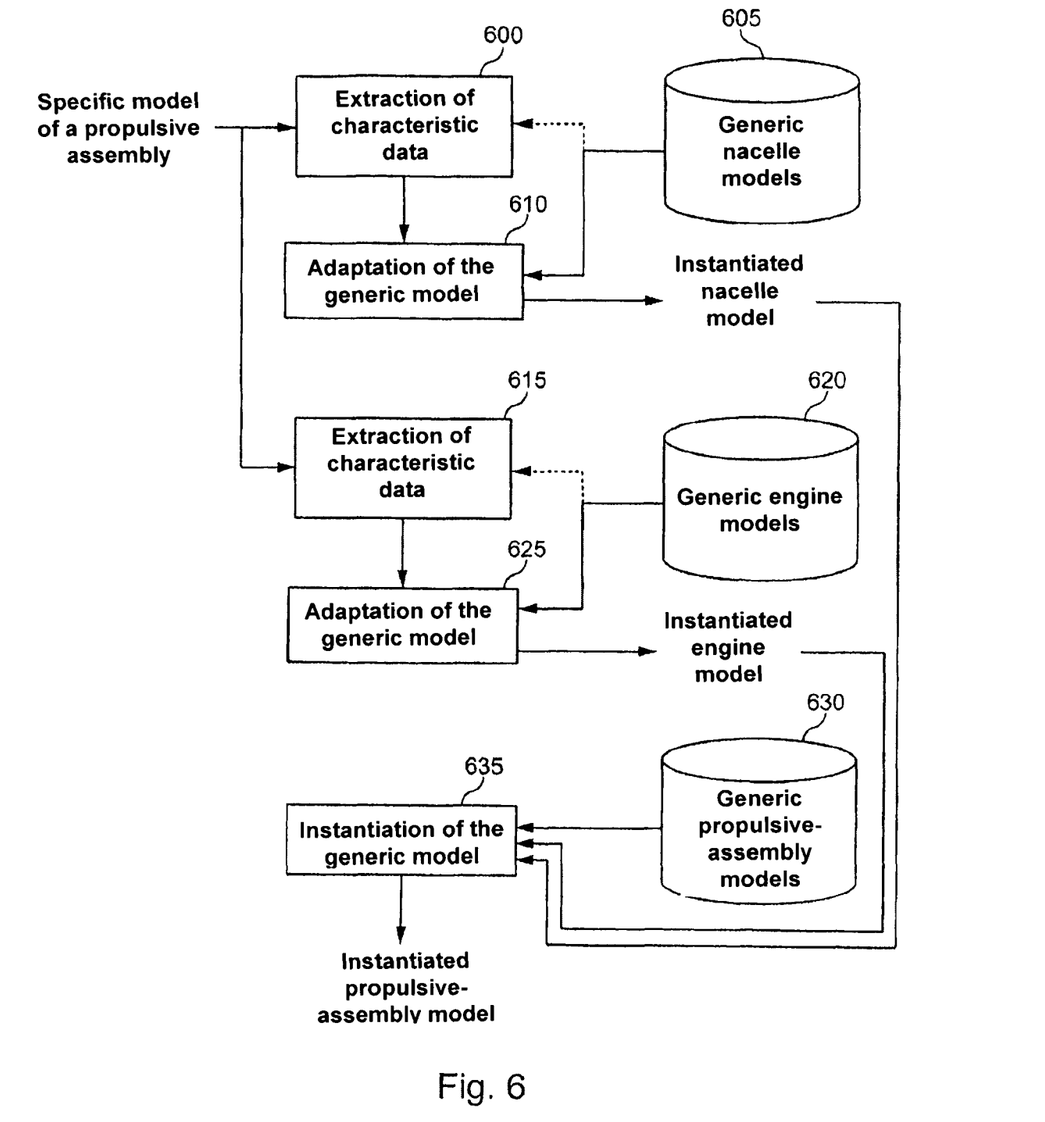
FIG. 6 illustrates another example in which an instantiated model of a nacelle, an instantiated model of an engine and an instantiated model of a propulsive assembly are obtained on the basis of a specific model of a propulsive assembly.

FIG. 6 illustrates another example in which an instantiated model of a nacelle, an instantiated model of an engine and an instantiated model of a propulsive assembly are obtained on the basis of a specific model of a propulsive assembly. According to step 600, the curves or profiles and the characteristic points of a nacelle are extracted from the specific model of a propulsive assembly. The curves and the characteristic points of the nacelle may be determined by the user according to the parameters of the generic model used for the nacelle and chosen by the user in a database 605, or may be determined automatically according to this model. The selected generic nacelle model is then adapted to the characteristic data extracted from the specific model of the propulsive assembly (step 610). The adaptation of the generic model to the curves extracted from the specific model of the propulsive assembly is preferably accomplished according to the method described in the foregoing with reference to FIG. 3. The adaptation of the generic nacelle model with the data extracted from the specific propulsive-assembly model yields an instantiated nacelle model.

Similarly, according to step 615, the curves or profiles and the characteristic points of an engine are extracted from the specific model of the propulsive assembly. The curves and the characteristic points of the engine may be determined by the user according to the parameters of the generic model used for the engine, chosen by the user in a database 620, or may be determined automatically according to this model. The selected generic engine model is then adapted to the characteristic data extracted from the specific model of the propulsive assembly (step 625). The adaptation of the generic model to the curves extracted from the specific model of the propulsive assembly is again preferably accomplished according to the method described in the foregoing with reference to FIG. 3. The adaptation of the generic model of an engine with the data extracted from the specific model of the propulsive assembly yields an instantiated engine model.

The data of the instantiated models of the nacelle and of the engine may be exported for use in another generic model. Thus the user may select a generic model of a propulsive assembly in a database 630 and import the data of the instantiated models of the nacelle and of the engine determined in the foregoing to instantiate the generic model of the propulsive assembly (step 635).

Naturally, to satisfy specific needs, a person skilled in the art of the invention will be able to apply modifications in the foregoing description.

The invention claimed is:

1. A method for aiding in geometric modeling of a first object on the basis of a generic model of the first object and of at least one specific model of at least one second object including at least part of the first object, the method comprising:
    acquiring the generic model of the first object;
    acquiring the at least one specific model of the at least one second object;
    extracting at least one datum for a curve portion from the at least one specific model of the at least one second object according to at least one parameter of the generic model of the first object; determining extrema of the curve portion extracted from the at least one specific model; and adapting the curve portion of the generic model corresponding to the curve portion extracted from the at least one specific model such that the extrema of the curve portion of the generic model are similar to the extrema of the curve portion extracted from the at least one specific model constructing an instantiated model, which is dynamic and modifiable, of the first object on the basis of an adaptation generic model of the first object and of the curve portion extracted from the at least one specific model of the at least one second object.

2. A method according to claim 1, wherein the at least one parameter of the generic model is adapted to the at least one datum extracted from the at least one specific model to construct the instantiated model.

3. A method according to claim 1, wherein the generic model is a dynamic model and the at least one specific model is a static model.

4. A method according to claim 1, wherein the adapting further comprises adjusting at least one intermediate point situated between the extrema of the curve portion of the generic model.

5. A method according to claim 1, wherein the adapting further comprises determining at least one tangent to the curve portion extracted from the at least one specific model at one point at least of the curve portion of the generic model.

6. A method according to claim 1, wherein the at least one second object corresponds to the first object or is part of the first object.

7. A method according to claim 1, further comprising importing at least one datum, the imported datum being stored in a memory as a parameter of the instantiated model.

8. A method according to claim 1, wherein the first object is a 3D object.

9. A method according to claim 8, wherein the first object is a nacelle, an engine, or a propulsive assembly.

10. A device comprising employing the method according to claim 1.

11. A non-transitory computer readable medium comprising computer executable instructions executing the method according to claim 1.

12. A method according to claim 1, wherein the curve portion is an upper nacelle profile.

13. A method according to claim 1, wherein the curve portion is a profile of a nozzle.

14. A method according to claim 1, wherein the curve portion is a profile of engine cowlings.

15. A method according to claim 1, wherein the curve portion is a profile of thrust reversers.

16. A method according to claim 1, wherein the curve portion is an intersection of part of the second object with a predetermined plane.

17. A method according to claim 1, wherein the generic model is a dynamic model and the at least one specific model is a static model from an aircraft supplier, and essential characteristics of the at least one specific model are extracted and added to the generic model.

18. A method according to claim 1, wherein with the instantiated model it is possible to modify parameters of the model without modifying source code.

* * * * *